(12) United States Patent
Wang et al.

(10) Patent No.: US 7,859,561 B2
(45) Date of Patent: Dec. 28, 2010

(54) METHOD AND SYSTEM FOR VIDEO CONFERENCE

(75) Inventors: Hao Wang, Beijing (CN); Ying Huang, Beijing (CN)

(73) Assignees: Vimicro Corporation, Beijing (CN); Wuxi Vimicro Corporation, Jiangsu (CN)

( * ) Notice: Subject to any disclaimer, the term of this patent is extended or adjusted under 35 U.S.C. 154(b) by 1146 days.

(21) Appl. No.: 11/530,134

(22) Filed: Sep. 8, 2006

(65) Prior Publication Data

US 2007/0159552 A1    Jul. 12, 2007

(30) Foreign Application Priority Data

Sep. 9, 2005    (CN) .................. 2005 1 0098356

(51) Int. Cl.
*H04N 7/14* (2006.01)
(52) U.S. Cl. ............. 348/14.08; 348/14.12; 348/14.07
(58) Field of Classification Search ... 348/14.01–14.16; 382/107, 236; 275/240.1; 370/260–261
See application file for complete search history.

(56) References Cited

U.S. PATENT DOCUMENTS 6,813,372 B2 * 11/2004 Standridge et al. .......... 382/107
2006/0245379 A1 * 11/2006 Abuan et al. ................ 370/261

* cited by examiner

*Primary Examiner*—Melur Ramakrishnaiah
(74) *Attorney, Agent, or Firm*—Wuxi Sino IP Agency, Ltd.; Joe Zheng

(57) ABSTRACT

Techniques for compressing video stream in a video conference are disclosed. According to one aspect of the techniques, the method comprises obtaining a frame image sequence and selecting a reference frame image; determining whether an N-th frame image has acute movements relative to the reference frame image according to a predetermined threshold; and if yes, compressing and transmitting the N-th frame image; otherwise, not compressing and transmitting the N-th frame image; increasing N by 1 and repeating the above operations till the frame image sequence is over.

15 Claims, 3 Drawing Sheets

METHOD AND SYSTEM FOR VIDEO CONFERENCE

BACKGROUND

1. Field of the Invention

The present invention relates to digital image processing, and more particularly to a method and system for video conference that utilizes a particular compression scheme.

2. Description of Related Art

Video conference systems operating on the Internet are being used in many areas. It is a conference solution based on the Internet Protocol (IP) network and utilizes video and audio compression technologies as well as point-to-point communication topology. Such a video conference system is not relying on fixed lines, fixed conference locations, or fixed equipments. The participants in a video conference may sit anywhere, such as in classroom, office, home, or any other remotely located places, and be connected with a virtual conference center (e.g., a conference organization server) located on the IP network via a notebook, a PC or other especial devices. Then, one participant in one location can exchange his/her audio, video or other data information with other participants in other locations.

A video compression method used in a video conference system is typically related to H.263 series, Motion Picture Expert Group 4 (MPEG-4) and Motion Joint Photographic Experts Group (JPEG), etc. The compression is provided to compress video streams according to the requirements of image quality and transmitting bandwidth. Although the conventional video compression methods have a relative higher compression ratio, the compressed video stream still requires an abundant bandwidth to have acceptable qualities. In many cases, the Internet access is through dial-up or wireless mobile phones, where the transmitting bandwidth is fairly limited. Hence, the conventional video compression method may not satisfy requirements in these applications.

Thus there is a need for techniques for compressing video streams that may be advantageously used in a video conference.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for a video conference system that takes advantages of a compression scheme. According to one aspect of the present invention, before an image is to be compressed for transmission over a network with a limited bandwidth, the image is detected to determine if there are any acute movements (e.g., a speaker moves suddenly). If there are no acute movements, the image is neither compressed nor transmitted. In other words, only those images that have sudden movements will be compressed and transmitted over the network. As a result, the bandwidth of the network to transmit such images will be considerably reduced. In any case, the audio data is sequentially compressed and transmitted.

On the receiving side, if it is noticed that some images are missing from a compressed stream, these missing images are reconstructed from prior images and then synchronized with the audio data to reproduce the conference video stream. One of the advantages of omitting the images with no sudden movements is that it would reduce the bandwidth requirements.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

An exemplary video conference system provided in the present invention comprises a plurality of client terminals by which respective participants can communicate with each other. Each client terminal comprises a transmitting terminal 100 for transmitting audio and video data to other clients and a receiving terminal 200 for receiving audio and video data from other client.

Figure 1A:
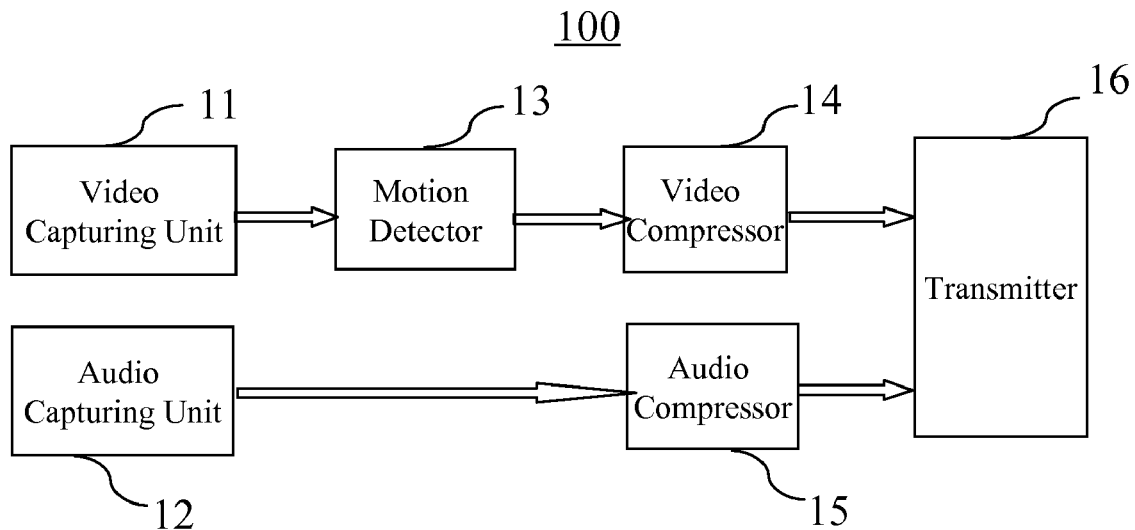
FIGS. 1a and 1b show two block diagrams, respectively, showing a transmitting terminal and a receiving terminal of a video conference system according to one embodiment of the present invention.
Figure 1B:
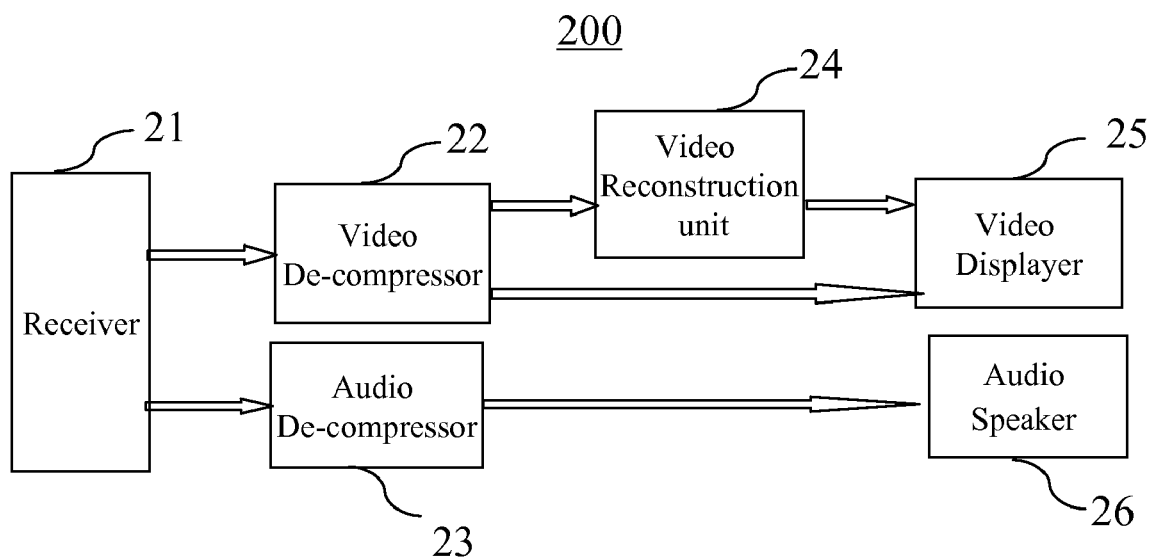

FIG. 1a shows a block diagram of the transmitting terminal 100 that includes a video capturing unit 11, an audio capturing unit 12, a motion detector 13, a video compressor 14 while FIG. 1b shows a block diagram of the receiving terminal 200 that includes a receiver 21, a video de-compressor 22, an audio de-compressor 23, a video reconstruction unit 24, a video display 25 and an audio speaker 26.

Referring now to FIG. 1a, the video capturing unit 11 is provided for capturing a frame image sequence at a predetermined frame ratio, such as 24 frames per second or 30 frames per second. The video capturing unit 11 may have a sensor array, one or more analog-to-digital converters (ADC). When the sensor array operates and is exposed to a scene, it generates an array of analog signals representing the scene. The analog signals are then digitized by the analog-to-digital converters to produce image data. Thus, the video capturing unit 11 produces a digital video stream and forwards it to the motion detector 13. In one embodiment, the video capturing unit 11 may be a camera or a video camera, etc.

In a certain time period of a video conference, the video capturing unit 11 focuses on one speaker, more particularly on the face of the speaker. In other words, the captured frame images may have nothing changed except for some slight facial movements of the speaker in the certain time. Under this condition, the motion detector 13 is particularly configured for determining whether a current frame image in the video stream has acute motions relative to a reference frame image. If not, it can be concluded that the speaker may only have some slight facial movements, such as moving his brow, opening his mouth and blinking his eye(s), etc, hence the current frame image is not required to be compressed and transmitted. Otherwise, it can be concluded that the speaker may have some acute movements, such as turning his head, looking up or down, or turning away from the video capturing unit 11, hence the current frame image is required to be compressed and transmitted.

In one embodiment, the current frame image may be regarded as a reference frame image. It should be noted that the motion detector 13 functions as designed until the video stream is over. The video compressor 14 is provided for compressing the video stream according to an instruction of the motion detector 13 and forwarding the compressed image data to the transmitter 16. The video compressor 14 may be one of many kinds of compressing standard, such as H.263 series, MPEG-4 or motion JPEG, etc.

Figure 2:
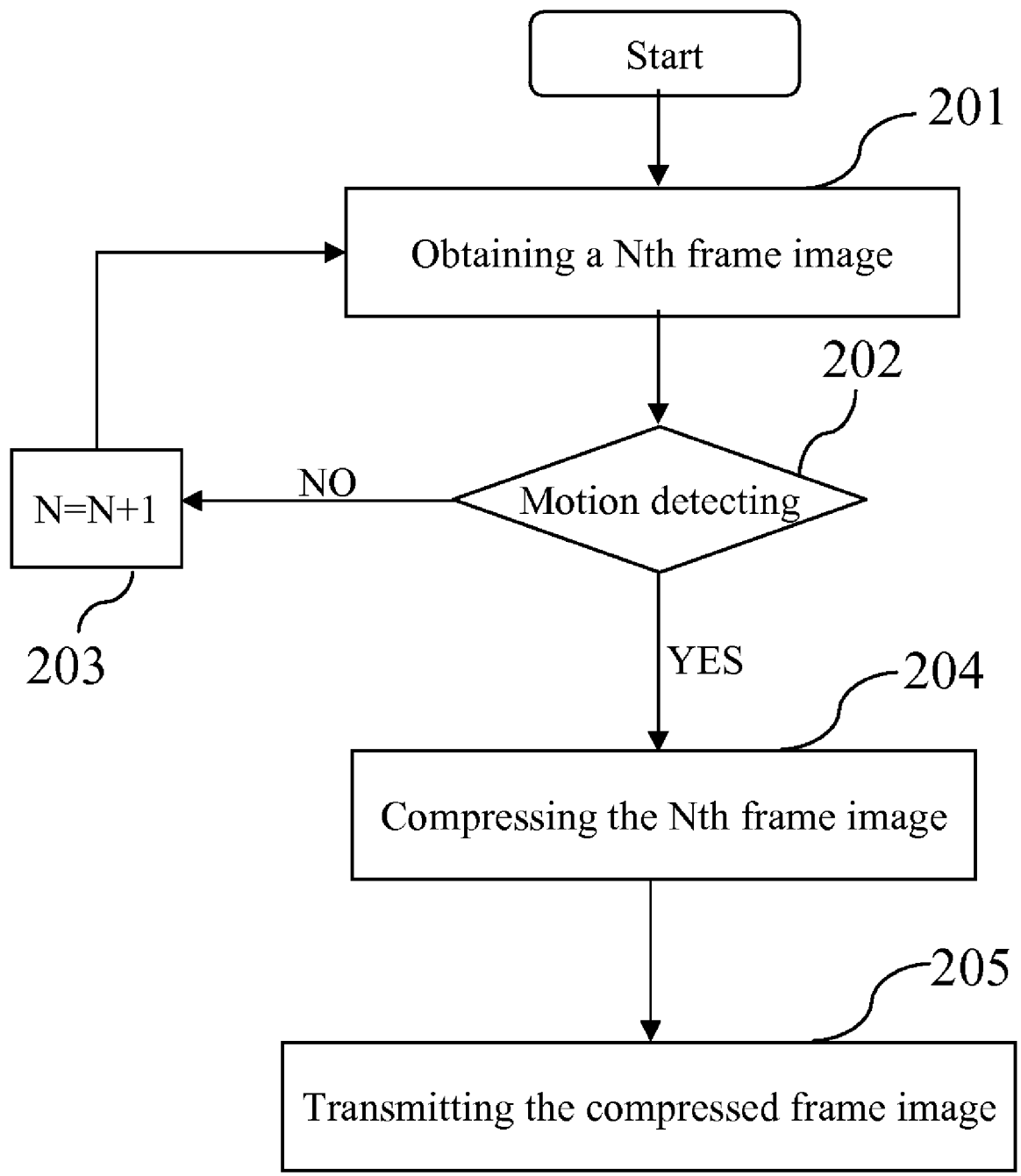
FIG. 2 is a flow chart showing a transmitting process during a video conference.

In one embodiment, as shown in FIG. 2, there shows a flowchart of transmitting process during a video conference. The motion detector 13 obtains, for example, an N-th frame image at 201 from the video capturing unit 11 as the current frame image. Then, the motion detector 13 gathers motion information of the current frame image, obtains a difference between the motion information of the current frame image and that of a reference frame image and then compares the difference with a predetermined threshold at 202. If the difference exceeds the predetermined threshold, it is concluded that the current frame image has some acute movements, then the video compressor 14 is activated to compress the current frame image according to the instruction of the motion detector 13 at 204. Otherwise, it is concluded that the current frame image has no acute movement, the video compressor 14 discards the current frame image according to the instruction of the motion detector 13 and the N is increased by 1 at 203 to repeat the operations until the video stream is over. Finally, the transmitter 16 transmits the compressed frame image to the IP internet at 205. It should be noted that how to gather the motion information and compare the difference with the threshold is well known by those skilled in the art, hence the details thereof is not to be provided herein to avoid obscuring aspects of the present invention.

Additionally, a face recognition technology, also well known in the art, may be introduced in the present invention. In one embodiment, an image portion occupied by the speaker's face is recognized by the face recognition technology and taken as a key to determine whether the video capturing unit 11 is focusing on the speaker's face.

The audio capturing unit 12 is provided for capturing audio signals in the video conference room. In one embodiment, the audio capturing unit 12 may be a microphone or a mike. To accommodate the data transferring bandwidth, the audio compressor 15 is provided for compressing the audio data from the audio capturing unit 12. The transmitter 16 is provided for harmonizing the compressed video and audio data and transmitting them to the IP network via any types of media, such as wireless connection, cable connection or other media. As described above, due to the configuration of the motion detector 13, the ratio of the video stream is greatly reduced, and the bandwidth occupied by the audio and video stream is decreased.

Referring now to FIG. 1b, the receiver 21 is provided for receiving and separating the compressed video and audio data from the IP network via any types of media, such as wireless connection, cable connection or other media. The audio de-compressor 23 is provided for de-compressing the compressed audio data from the receiver 21 according to corresponding decoding standard. The de-compressed audio data is delivered to the audio speaker 26 for broadcasting. Thereby, the participants to the conference can hear the voice of the speaker. Similarly, the video de-compressor 22 is provided for de-compressing the compressed audio data coming from the receiver according to a corresponding decoding standard, such as, H.263 serial, MPEG-4 or motion JPEG, etc. Because not every frame image is compressed and transmitted by the transmitting terminal, a judgment operation needs to be performed by the video de-compressor 22 before de-compressing.

Figure 3:
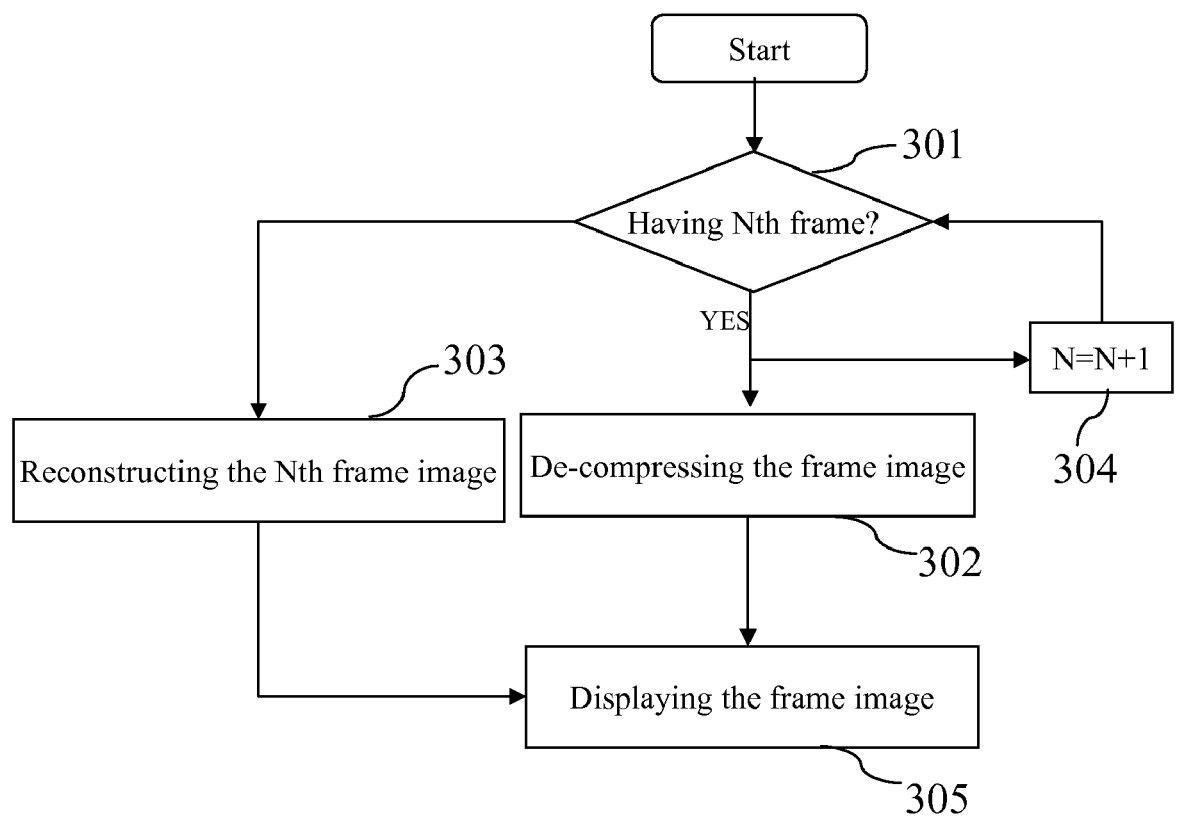
FIG. 3 is a flow chart showing a receiving process during a video conference.

As shown in FIG. 3, there is a receiving process during a video conference. The process begins at a decision block 301 to decide whether the N-th frame image contained is in the compressed video stream. If yes, the video de-compressor 22 de-compresses the N-th frame image at 302 and forwarded the de-compressed frame image to the video displayer 25. Otherwise, the video reconstruction unit 24 reconstructs the Nth frame image according to the last frame image and the audio signal from the audio de-compressor at 303 and forward the reconstructed frame image to the video displayer 25. The video displayer 25 displays the frame image from the video de-compressor and the video reconstruction unit at 305, thereby the participants can see the images of the speaker. The N is increased by 1 at 304, and the above operation is repeated until the video stream is over.

The image reconstruction performed by the video reconstruction unit 24 includes the following operations: selecting the last frame image as a model image; analyzing the model image to recognize facial main characters, such as the eye(s), the mouth and the jaw etc, reconstructing the N-th frame image by matching the movement of the facial main characters in the model image according to the audio signal from the audio de-compressor 23. The way how to match the movement of the facial main characters in the model image according to the audio signal is described in a commonly-assigned co-pending U.S. application Ser. No. 11/456,318 which is hereby incorporated by reference.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

What is claimed is:

1. A method comprising:
receiving at a broadcasting terminal a sequence of images and selecting one of the images as a reference frame image;
determining whether an N-th frame image has acute movements relative to the reference frame image according to a predetermined threshold; and
compressing and transmitting the N-th frame image from the broadcasting terminal when there are acute movements in the N-th frame image;
neither compressing nor transmitting the N-th frame image when there are no acute movements in the N-th frame image; and
reconstructing the N-th frame image at a receiving terminal by matching facial movements in a prior image in reference to an audio signal from an audio de-compressor, wherein the sequence of images including the reconstructed N-th image is displayed in the receiving terminal.

2. The method as claimed in claim 1, wherein the N-th frame image is regarded as the reference frame image in a next cycle.

3. The method as claimed in claim 1, wherein each of images mainly shows a speaker's face.

4. The method as claimed in claim 3, wherein an image portion occupied by the speaker's face is taken as a key to determine whether the frame image shows the facial movements.

5. The method as claimed in claim 1, wherein said determining whether an N-th frame image has acute movements relative to the reference frame image according to a predetermined threshold comprises:
gathering motion information of the N-th frame image and the reference frame image;
determining a difference between the motion information of the N-th frame image and that of the reference frame image;
comparing the difference with the predetermined threshold;
if the difference exceeds the predetermined threshold,
it is concluded that the N-th frame image has acute movements;
if the difference does not exceed the predetermined threshold,
it is concluded that the Nth frame image has no acute movements.

6. The method as claimed in claim 1, wherein said compressing and transmitting the N-th frame image comprises compressing the N-th image according to a compression standard.

7. A method for video conference, comprising:
obtaining a sequence of images and selecting one of the images as a reference frame image;
determining whether an N-th frame image has acute movements relative to the reference frame image according to a predetermined threshold; and
if the N-th frame image has acute movements,
compressing and transmitting the N-th frame image;
if the N-th frame image does not have acute movements,
neither compressing nor transmitting the N-th frame image;
receiving a compressed frame image sequence;
determining whether the compressed frame image sequence includes the N-th frame image;
if the N-th frame image is included,
de-compressing the N-th compressed frame image;
if the N-th frame image is not included,
reconstructing the N-th frame image according to a last frame image prior to the N-th frame image by matching facial movements in a prior image in reference to an audio signal from an audio de-compressor;
displaying the reconstructed or de-compressed N-th frame image;
increasing N by 1 and repeating above operations till the compressed frame image sequence is over.

8. The method as claimed in claim 7, wherein the N-th frame image is regarded as the reference frame image in a next cycle.

9. The method as claimed in claim 7, further comprising:
capturing audio data;
compressing audio data;
transmitting the compressed audio data;
receiving the compressed audio data;
de-compressing the compressed audio data; and
reproducing audio from the de-compressed audio data.

10. The method as claimed in claim 7, wherein said reconstructing the N-th frame image comprises:
selecting the last frame image as a model image;
recognizing facial main characters in the model image; and
reconstructing the N-th frame image by matching movements of the facial main characters in the model image according to the de-compressed audio data.

11. The method as claimed in claim 7, wherein said determining whether the N-th frame image has acute movements comprises:
gathering motion information of the N-th frame image and the reference frame image;
calculating a difference between the motion information of the N-th frame image and that of the reference frame image;
comparing the difference with the predetermined threshold;
if the difference exceeds the predetermined threshold,
it is concluded that the N-th frame image has acute movements;
if the difference does not exceed the predetermined threshold,
it is concluded that the Nth frame image has no acute movements.

12. A system for video conference, comprising:
a transmitting terminal comprising:
a video capturing unit for capturing a frame image sequence mainly containing a speaker's face;
a motion detector for determining whether an N-th frame image has acute movements relative to a reference frame image according to a predetermined threshold; and
a video compressor for compressing the N-th frame image according to an instruction of the motion detector, if the N-th frame image has acute movement relative to the reference frame image, the video compressor compressing the N-th frame image; otherwise, the video compressor neither compressing the N-th frame image nor causing the N-th frame image to be transmitted;
a transmitter for transmitting the compressed N-th frame image over a network;
a receiving terminal comprising:
a receiver for receiving the compressed N-th frame image from the network;
a video reconstruction unit;
a video de-compressor for determining whether the Nth frame image is present, if yes, the video de-compressor de-compressing the compressed N-th frame image; otherwise the video reconstruction unit reconstructing the N-th frame image by matching facial movements in a prior image in reference to an audio signal from an audio de-compressor; and a displayer for displaying the reconstructed or de-compressed frame image.

13. The system as claimed in claim 12, wherein the transmitting terminal further comprises an audio capturing module for capturing audio data and an audio compressor for compressing the audio data, and wherein the compressed audio data is transmitted to the network by the transmitter.

14. The system as claimed in claim 12, wherein the receiving terminal further comprises an audio de-compressor for de-compressing the compressed audio data from the receiver and an audio speaker for playing the de-compressed audio data.

15. The system as claimed in claim 12, wherein the video reconstruction unit is configured to perform operations of:
  selecting the last frame image as a model image;
  recognizing facial main characters, including eye(s), mouth and the jaw;
  reconstructing the Nth frame image by matching movement of facial main characters in the model image according to the de-compressed audio data.

* * * * *